United States Patent
Sato

(10) Patent No.: US 11,115,552 B2
(45) Date of Patent: Sep. 7, 2021

(54) MULTIFUNCTION PERIPHERAL CAPABLE OF EXECUTING DOUBLE-SIDED READING PROCESS, METHOD OF CONTROLLING SAME, AND STORAGE MEDIUM

(71) Applicant: CANON KABUSHIKI KAISHA, Tokyo (JP)

(72) Inventor: Kazuki Sato, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/944,616

(22) Filed: Jul. 31, 2020

(65) Prior Publication Data

US 2021/0067652 A1 Mar. 4, 2021

(30) Foreign Application Priority Data

Sep. 4, 2019 (JP) .............................. JP2019-161157

(51) Int. Cl.
*H04N 1/00* (2006.01)

(52) U.S. Cl.
CPC ..... *H04N 1/00822* (2013.01); *H04N 1/00572* (2013.01); *H04N 1/00652* (2013.01)

(58) Field of Classification Search
None
See application file for complete search history.

(56) References Cited

U.S. PATENT DOCUMENTS

| 4,393,387 | A | * | 7/1983 | Kitamura | G06K 15/1261 347/240 |
| 5,119,145 | A | * | 6/1992 | Honjo | G03B 27/6264 271/259 |
| 5,619,343 | A | * | 4/1997 | Amemiya | H04N 1/203 358/401 |
| 6,067,170 | A | * | 5/2000 | Kawashima | H04N 1/00572 358/405 |
| 7,057,762 | B1 | * | 6/2006 | Watanabe | H04N 1/0096 358/1.13 |
| 7,121,660 | B2 | * | 10/2006 | Ide | B41J 2/2114 347/101 |
| 10,038,819 | B2 | * | 7/2018 | Togashi | H04N 5/378 |

(Continued)

FOREIGN PATENT DOCUMENTS

JP 2013153521 A 8/2013

*Primary Examiner* — Anh-Vinh T Nguyen
(74) *Attorney, Agent, or Firm* — Rossi, Kimms & McDowell LLP

(57) ABSTRACT

A multifunction peripheral capable of preventing discontinuation of a simultaneous double-sided reading process, caused by congestion of an image bus. An image transfer clock is controlled for transferring image data of a document sheet from a reading unit for reading both sides of the document sheet, to an image processing unit for performing image processing on data acquired via an image bus. When transfer of image data of one side of the document sheet is singly executed, a frequency of the image transfer clock is set to a predetermined frequency, and when transfer of image data of the other side of the document sheet, which is executed in succession to the transfer of image data of the one side, is to be executed in parallel with the image processing, the frequency is switched from the predetermined frequency to a lower frequency than the same.

9 Claims, 16 Drawing Sheets

(56) References Cited

U.S. PATENT DOCUMENTS

| | | | |
|---|---|---|---|
| 10,477,061 B2* | 11/2019 | Oka | H04N 1/0083 |
| 10,819,878 B2* | 10/2020 | Hirao | H04N 1/047 |
| 10,841,445 B2* | 11/2020 | Kasuya | H04N 1/32448 |
| 2001/0050778 A1* | 12/2001 | Fukuda | H04N 1/4095 |
| | | | 358/1.9 |
| 2006/0152785 A1* | 7/2006 | Yasuda | G02B 26/085 |
| | | | 359/224.1 |
| 2006/0182473 A1* | 8/2006 | Matsui | G03G 15/1605 |
| | | | 399/302 |
| 2007/0121771 A1* | 5/2007 | Yamada | G06F 1/3203 |
| | | | 375/362 |
| 2008/0068681 A1* | 3/2008 | Ishido | H04N 1/203 |
| | | | 358/498 |
| 2008/0180765 A1* | 7/2008 | Nakashita | H04N 1/2034 |
| | | | 358/498 |
| 2011/0279873 A1* | 11/2011 | Tsugimura | H04N 1/32283 |
| | | | 358/404 |
| 2017/0237873 A1* | 8/2017 | Watanabe | H04N 1/2032 |
| | | | 358/408 |
| 2017/0310844 A1* | 10/2017 | Narita | H04N 1/00931 |
| 2018/0255197 A1* | 9/2018 | Oka | H04N 1/2034 |

* cited by examiner

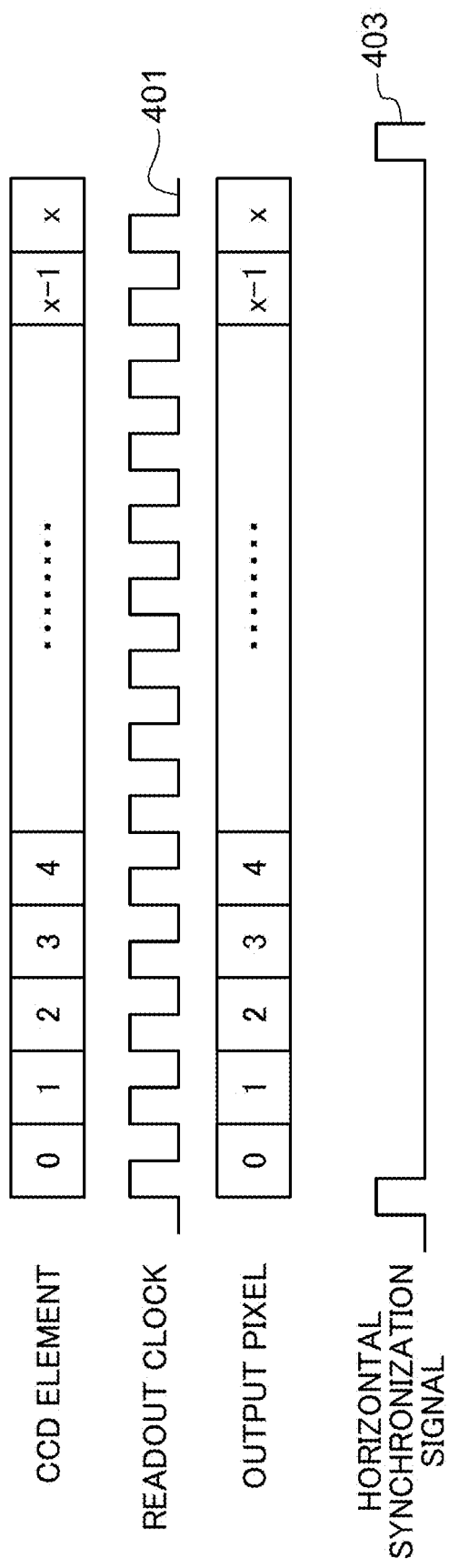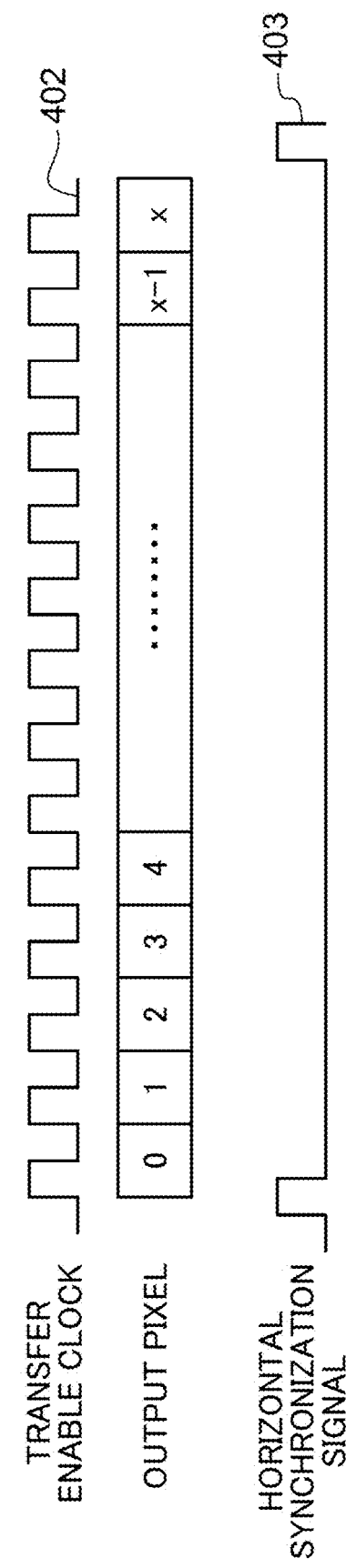

*FIG. 13*

| SCAN | ○ | ○ | ○ |
|---|---|---|---|
| PRINT | | ○ | |
| RIP | | | |
| SEND | | | ○ |
| FAX | | | |

MULTIFUNCTION PERIPHERAL CAPABLE OF EXECUTING DOUBLE-SIDED READING PROCESS, METHOD OF CONTROLLING SAME, AND STORAGE MEDIUM

BACKGROUND OF THE INVENTION

Field of the Invention

The present invention relates to a multifunction peripheral that is capable of executing a double-sided reading process, a method of controlling the same, and a storage medium.

Description of the Related Art

There is known a multifunction peripheral (MFP) that has a plurality of functions, such as a scan function and a print function. The MFP has a plurality of reading speeds for the scan function and one of the reading speeds is used by selection according to use (see e.g. Japanese Laid-Open Patent Publication (Kokai) No. 2013-153521).

The MFP includes a controller that controls a scanner section and a printer section thereof, and the controller includes a main memory and a plurality of image processing ASICs that perform different types of image processing on image data. The image processing ASICs share the main memory and transmit and receive image data to and from the main memory via an image bus. For example, in a case where a scan job for reading a plurality of pages of originals (document sheets) and another job for performing image processing on data are executed in parallel, many of the image processing ASICs perform data transfer to and from the main memory via the above-mentioned image bus in parallel. In this case, the amount of data transfer via the image bus per unit time increases. For the image bus, an upper limit value indicative of the maximum amount of data which can be transferred per unit time is defined. If the amount of data transfer via the image bus exceeds the upper limit value, data transfer between each image processing ASIC and the main memory is delayed or stopped, which causes discontinuation of the scan job and the other job.

Particularly, an MFP equipped with a simultaneous double-sided reading function simultaneously reads a front side and a reverse side of an original in a simultaneous double-sided reading process and sequentially transfers image data items of the front side and the reverse side, acquired by reading the original, in the mentioned order. In the simultaneous double-sided reading process, the MFP is required to transfer the image data items of the two sides of one original in succession, and hence a transfer time required to transfer image data increases compared with a transfer time required to transfer image data in a single-sided reading process. Due to an increase in the time required to transfer image data, there is an increased risk that during transfer of image data via the image bus, another image processing is executed in parallel therewith, which causes congestion of the image bus, resulting in discontinuation of the simultaneous double-sided reading process.

SUMMARY OF THE INVENTION

The present invention provides a multifunction peripheral that is capable of preventing discontinuation of a double-sided reading process, caused by congestion of an image bus, a method of controlling the same, and a storage medium.

In a first aspect of the present invention, there is provided a multifunction peripheral comprising a reading unit configured to read both sides of a document sheet, an image processing unit configured to perform image processing on data acquired via an image bus, and a clock control unit configured to control an image transfer clock for transferring image data of the document sheet from the reading unit to the image processing unit via the image bus, wherein the clock control unit sets, in a case where transfer of image data of one side of the document sheet is singly executed, a frequency of the image transfer clock to a predetermined frequency, and switches, in a case where transfer of image data of the other side of the document sheet, which is executed in succession to the transfer of image data of one side of the document sheet, is to be executed in parallel with the image processing, the frequency of the image transfer clock from the predetermined frequency to a frequency lower than the predetermined frequency.

In a second aspect of the present invention, there is provided a method of controlling a multifunction peripheral that is provided with a reading unit configured to read both sides of a document sheet and an image processing unit configured to perform image processing on data acquired via an image bus, the method comprising controlling an image transfer clock for transferring image data of the original from the reading unit to the image processing unit via the image bus, setting, in a case where transfer of image data of one side of the document sheet is singly executed, a frequency of the image transfer clock to a predetermined frequency, and switching, in a case where transfer of image data of the other side of the document sheet, which is executed in succession to the transfer of image data of one side of the document sheet, is to be executed in parallel with the image processing, the frequency of the image transfer clock from the predetermined frequency to a frequency lower than the predetermined frequency.

In a third aspect of the present invention, there is provided a non-transitory computer-readable storage medium storing a computer-executable program for executing a method of controlling a multifunction peripheral that is provided with a reading unit configured to read both sides of a document sheet and an image processing unit configured to perform image processing on data acquired via an image bus, wherein the method comprises controlling an image transfer clock for transferring image data of the document sheet from the reading unit to the image processing unit via the image bus, setting, in a case where transfer of image data of one side of the document sheet is singly executed, a frequency of the image transfer clock to a predetermined frequency, and switching, in a case where transfer of image data of the other side of the document sheet, which is executed in succession to the transfer of image data of one side of the document sheet, is to be executed in parallel with the image processing, the frequency of the image transfer clock from the predetermined frequency to a frequency lower than the predetermined frequency.

According to the present invention, it is possible to prevent discontinuation of the simultaneous double-sided reading process, caused by congestion of the image bus.

Further features of the present invention will become apparent from the following description of exemplary embodiments (with reference to the attached drawings).

BRIEF DESCRIPTION OF THE DRAWINGS

FIGS. 4A and 4B are diagrams useful in explaining clocks for performing readout control of images read by a CIS appearing in FIG. 2.

FIG. 13 is a diagram showing an example of combinations of image processing operations which can be executed in parallel in a single transfer clock mode.

DESCRIPTION OF THE EMBODIMENTS

The present invention will now be described in detail below with reference to the accompanying drawings showing embodiments thereof.

Figure 1:
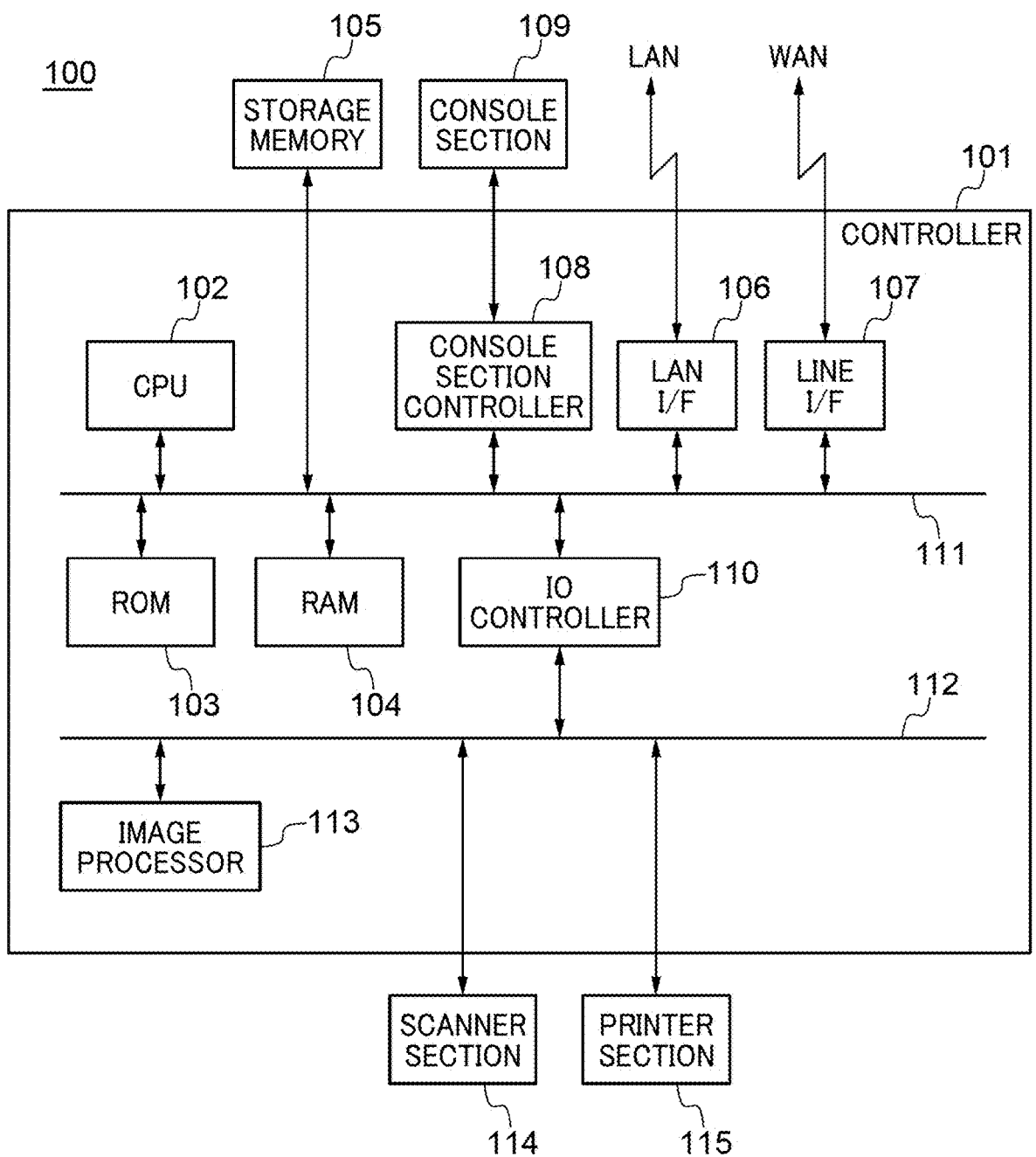
FIG. 1 is a schematic block diagram of a multifunction peripheral (MFP) according to an embodiment of the present invention.

FIG. 1 is a schematic block diagram of a multifunction peripheral (MFP) 100 according to an embodiment of the present invention.

Referring to FIG. 1, the MFP 100 includes a controller 101, a storage memory 105, a console section 109, a scanner section 114, and a printer section 115. The controller 101 is connected to the storage memory 105, the console section 109, the scanner section 114, and the printer section 115. Further, the controller 101 includes a CPU 102, a ROM 103, a RAM 104, a LAN interface 106, a line interface 107, a console section controller 108, an IO controller 110, and an image processor 113. The CPU 102, the ROM 103, the RAM 104, the LAN interface 106, the line interface 107, the console section controller 108, and the IO controller 110 are interconnected via a system bus 111. The image processor 113 is connected to the IO controller 110 via an image bus 112.

The controller 101 controls the overall operation of the MFP 100. The CPU 102 executes programs stored in the ROM 103 or the storage memory 105 to thereby cause software modules (not shown) of the MFP 100 to execute respective processes. The ROM 103 stores a system boot program, etc. The RAM 104 is a system work memory area for the CPU 102 that executes the software modules (not shown) of the MFP 100. Further, the RAM 104 is an image memory for temporarily storing image data when processing the image data. The storage memory 105 is implemented by an HDD or an SSD (Solid State Drive) and is used as an internal storage. In the storage memory 105, there are stored, for example, the system software modules for realizing the functions of the MFP 100 and image data transferred from the RAM 104.

The LAN interface 106 is an interface for connecting the MFP 100 to a LAN. The LAN interface 106 performs data communication with an external apparatus connected to the LAN. The line interface 107 is an interface for connecting the MFP 100 to a WAN. The line interface 107 performs data communication with an external apparatus connected to the WAN. The console section controller 108 is an interface between the controller 101 and the console section 109. The console section controller 108 outputs VGA signals to the console section 109 to display an image corresponding to the VGA signals on the console section 109. Further, the console section controller 108 outputs information input by a user on the console section 109 to the CPU 102. The console section 109 is comprised of an LCD touch panel, etc. The console section 109 interprets the VGA signals output from the console section controller 108 to thereby display an image corresponding to the VGA signals.

Figure 7:
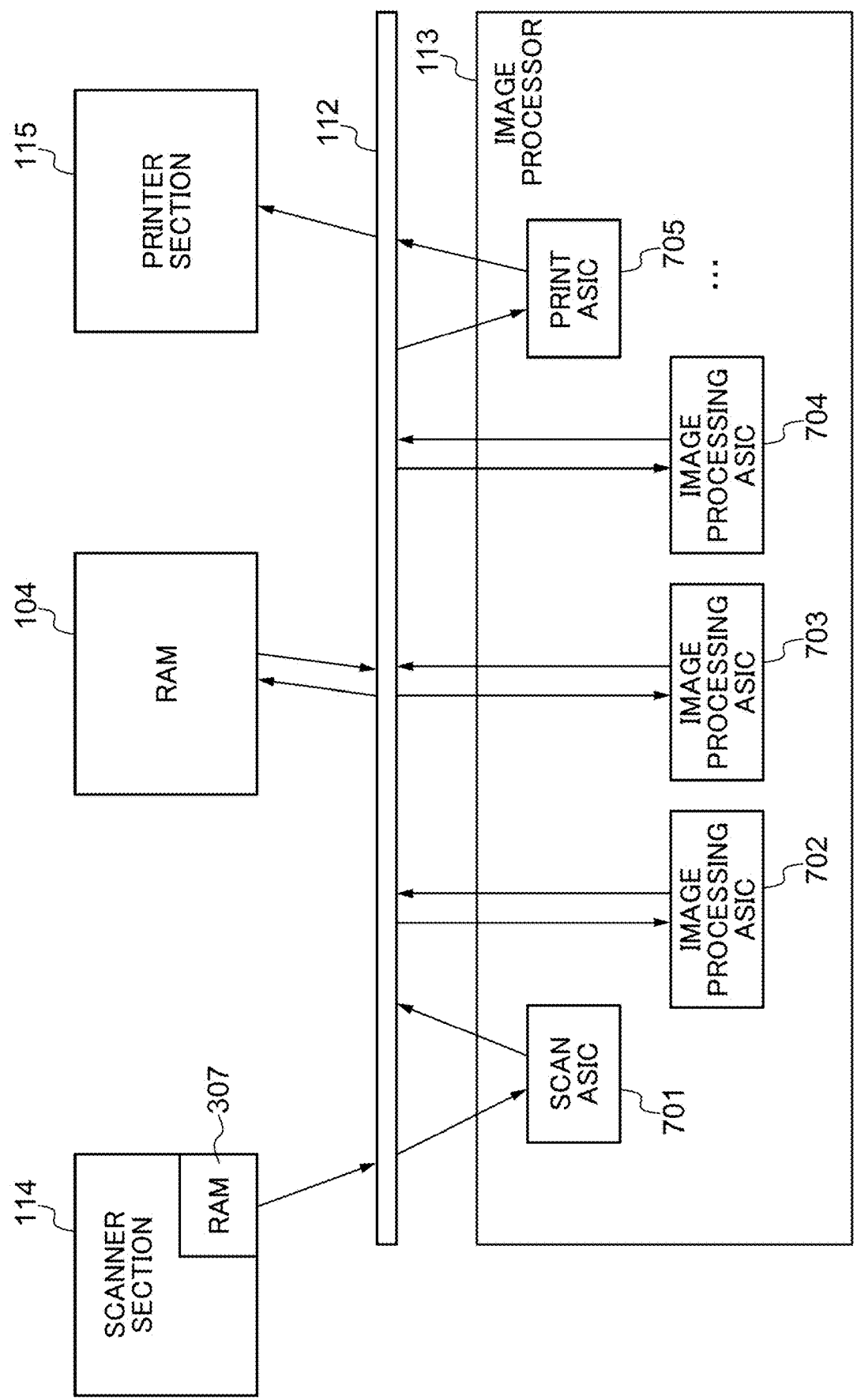
FIG. 7 is a block diagram useful in explaining the configuration of an image processor appearing in FIG. 1.

The IO controller 110 is a bus bridge that connects between the system bus 111 and the image bus 112 and converts the data structure of the system bus 111. The image bus 112 is implemented by a general-purpose bus, such as a PCI bus, an IEEE 1394 bus, and a PCI-Ex bus, and transfers image data at a high data transfer rate. To the image bus 112, not only the IO controller 110 and the image processor 113, but also the scanner section 114 and the printer section 115 are connected. The image bus 112 performs synchronous-to-asynchronous or asynchronous-to-synchronous conversion of image data. The image processor 113 is comprised of a plurality of ASICs, as shown in FIG. 7, described hereinafter. The image processor 113 performs image processing, such as resolution conversion, compression, expansion, and binary-data/multi-valued data conversion, on image data. The scanner section 114 includes a DF (Document Feeder) section 200 appearing in FIG. 2 and a scanner control unit 300 appearing in FIG. 3. The scanner section 114 reads an original (document sheet) to generate image data. The printer section 115 prints the image data generated by the scanner section 114.

Figure 2:
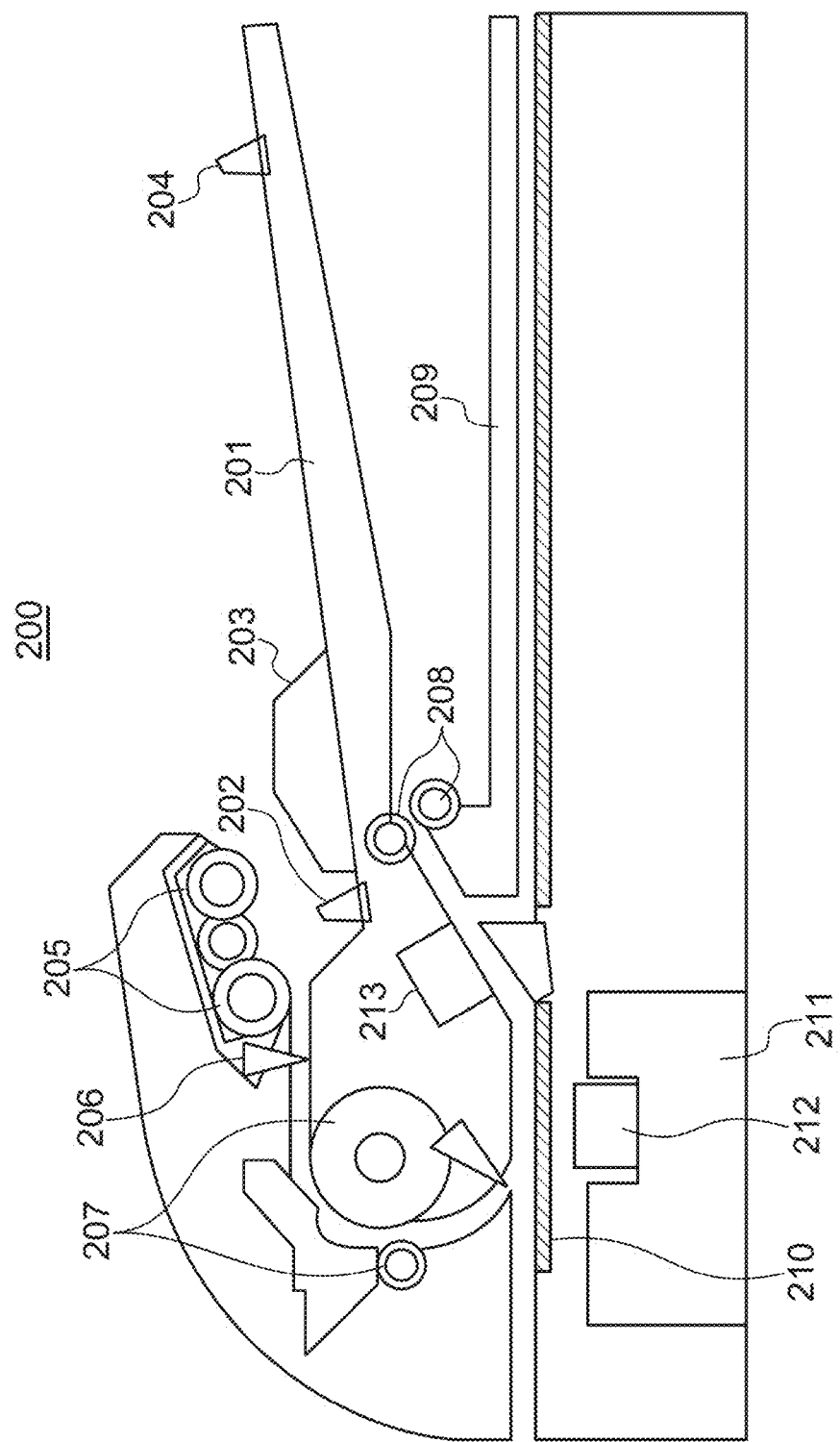
FIG. 2 is a schematic side view of an internal structure of a DF section of a scanner section appearing in FIG. 1.

FIG. 2 is a schematic side view of an internal structure of the DF section 200 of the scanner section 114 appearing in FIG. 1. Note that FIG. 2 shows the internal configuration in a see-through fashion for ease of understanding.

The DF section 200 is provided with an original tray 201 for placing originals thereon. The original tray 201 is provided with a document sensor 202, two original guides 203, and an original size detection sensor 204. The document sensor 202 detects whether or not there is any original placed on the original tray 201. The two original guides 203 are arranged along an original conveying direction such that they are opposed to each other. Originals placed on the original tray 201 are each conveyed by rollers of the three kinds: pickup rollers 205, conveying rollers 207, and discharge rollers 208. The pickup rollers 205 convey each of the originals placed on the original tray 201 to an original conveying path in the DF section 200. The original conveyed by the pickup rollers 205 is detected by an original passage detection sensor 206. In the DF section 200, whether or not a first original has passed is determined based on a time at which the original was detected by the original passage detection sensor 206. The conveying rollers 207 convey the original conveyed to the original conveying path by the pickup rollers 205 to the discharge rollers 208. The discharge rollers 208 convey the original conveyed by the conveying rollers 207 to a discharge tray 209. Note that the pickup rollers 205, the conveying rollers 207, and the discharge rollers 208 are driven by a stepping motor (not shown).

The original conveyed to the original conveying path is read by a sensor unit 211 when passing a transparent DF reading window 210 arranged on the original conveying path. The sensor unit 211 includes a CIS (Contact Image Sensor) 212. The original conveyed to the original conveying path is brought to a position where the sensor unit 211 can read the original through the DF reading window 210. The sensor unit 211 can freely move in a sub scanning direction, i.e. in the same direction as the direction of conveying the original conveyed from the conveying rollers 207 toward the discharge rollers 208. Note that the DF reading window 210 has a certain length in the sub scanning direction. The CIS 212 can move to a desired position within a range of the length of the DF reading window 210, and read the original at the position to which it is moved. The CIS 212 is comprised of a plurality of photoelectric conversion elements, such as CCD elements. The CCD elements are arranged in one line in the CIS 212. The CIS 212 generates a control signal for controlling e.g. a FIFO for storing pixel data read by each CCD element.

The MFP 100 is capable of performing a simultaneous double-sided reading process, and includes another CIS 213 disposed on the other side of the original conveying path opposite from the side where the CIS 212 is arranged. The configuration and functions of the CIS 213 are similar to those of the CIS 212 and hence description thereof is omitted.

Figure 3:
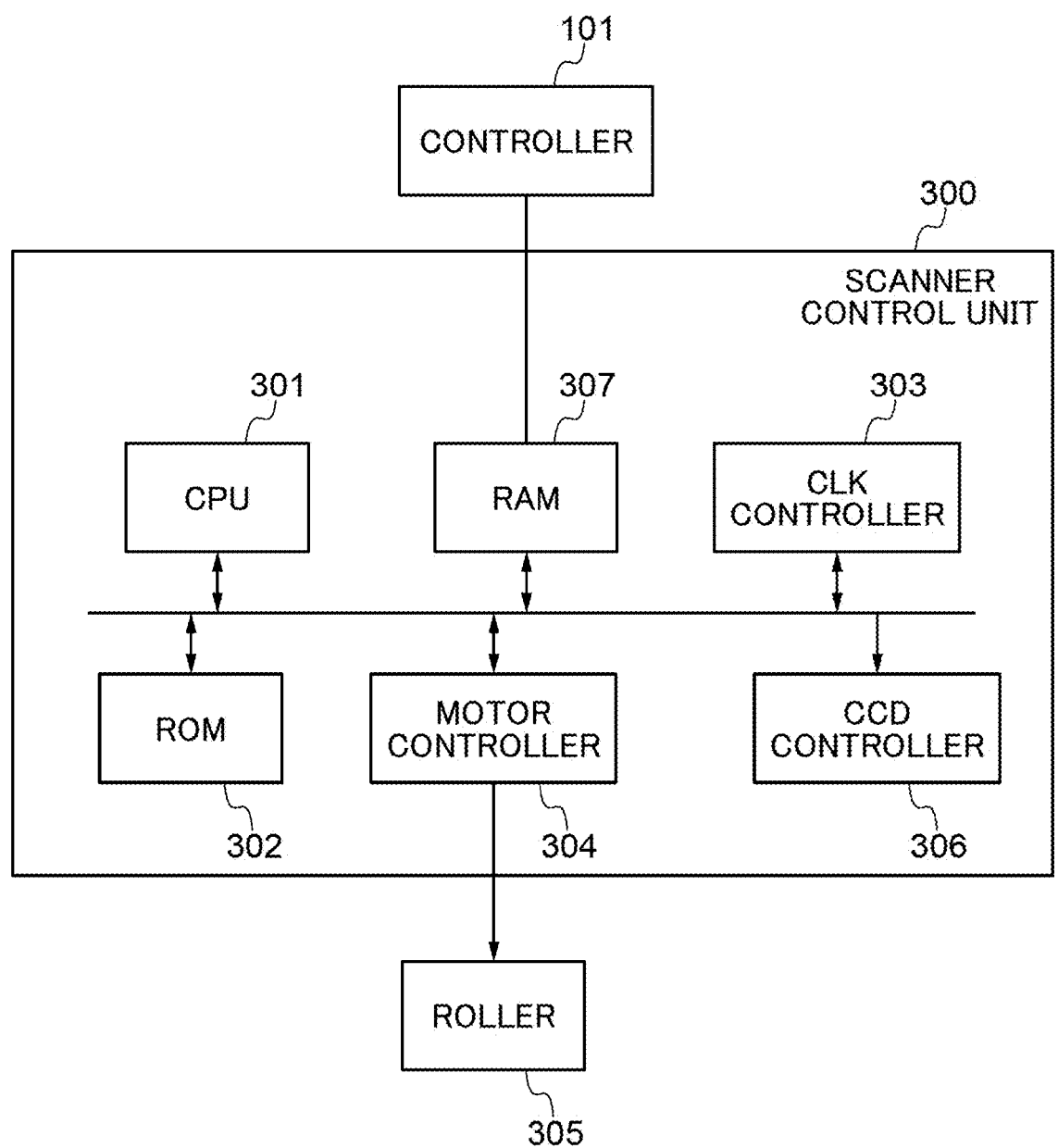
FIG. 3 is a schematic block diagram of a scanner control unit of the scanner section appearing in FIG. 1.

FIG. 3 is a schematic block diagram of the scanner control unit 300 of the scanner section 114 appearing in FIG. 1.

Referring to FIG. 3, the scanner control unit 300 includes a CPU 301, a ROM 302, a clock controller 303 (clock control unit), a motor controller 304, a CCD controller 306, and a RAM 307.

The scanner control unit 300 controls the operation of the scanner section 114 by causing the CPU 301 to execute a scanner section control application program (not shown) stored in the ROM 302. The scanner section control application program is a program for starting a scanner section control application (not shown) for controlling the scanner control unit 300. Note that although in the present embodiment, the description is given of a case where the CPU 301 executes the scanner section control application program, a device that executes the scanner section control application program is not limited to the CPU 301. For example, the CPU 102 of the controller 101 may control the operation of the scanner section 114 by executing the scanner section control application program.

The clock controller 303 provides clocks to devices as the components of the scanner control unit 300. The clocks include an image transfer clock, referred to hereinafter. The clock controller 303 is comprised of a crystal oscillator (not shown) that generates a clock and a PLL (Phase-Locked Loop; not shown). The PLL multiplies or divides the frequency of a clock generated by the crystal oscillator. When a scan execution instruction is received from a user, in the scanner section 114, the clock controller 303 delivers clocks to the motor controller 304, the CCD controller 306, and the RAM 307. For example, the motor controller 304 generates a control clock for a motor (not shown) that rotates a roller 305 based on the clock received from the clock controller 303. The scan execution instruction includes information on distinction between color scanning and monochrome scanning, a scanning resolution, etc. The scanner section control application changes the settings of the PLL of the clock controller 303 based on the contents of the instruction. The clock controller 303 controls the frequencies of the clocks to be output based on the settings of the PLL. With this, the reading speed of the scanner section 114 is changed. The RAM 307 accumulates image data of originals read by the CIS 212. The RAM 307 is a storage device having a relatively small capacity which can store e.g. image data of four originals of A-4 size.

The scanner control unit 300 controls readout of an image from the CIS 212 based on a readout clock 401 in FIG. 4A and a transfer enable clock 402 in FIG. 4B. The readout clock 401 is a clock signal for reading out pixel data as a component of image data from each CCD element. The transfer enable clock 402 is an image transfer clock. The image transfer clock is a clock signal for controlling whether or not to transfer the read pixel data to the controller 101. The scanner control unit 300 reads out pixel data from each CCD element when the readout clock 401 rises. The pixel data read out from each CCD element is accumulated in the RAM 307. Further, the scanner control unit 300 transfers the pixel data accumulated in the RAM 307 to the controller 101 in synchronism with the rise of the transfer enable clock 402 controlled based on a horizontal synchronization signal 403 in FIG. 4A. The horizontal synchronization signal 403 is a clock signal for controlling the start of capturing data from a single line of the CCD elements.

Further, the scanner control unit 300 generates a PWM signal for driving the pickup rollers 205 provided in the scanner section 114 in synchronism with the horizontal synchronization signal 403. In the MFP 100, in a case where high-speed reading is performed, the period of the horizontal synchronization signal 403 is shortened. This increases the rotational speed of the pickup rollers 205, so that the original conveying speed is increased, whereby the reading speed per one original is increased. Further, to perform readout from the CCD elements in a shorter time in accordance with the original reading speed, the scanner control unit 300 increases the frequency of the readout clock 401. The scanner control unit 300 accumulates the pixel data in the RAM 307 in synchronism with the period of the readout clock 401. Further, the scanner control unit 300 increases the frequency of the transfer enable clock 402 in accordance with the control of the frequency of the readout clock 401, and thereby transfers the pixel data from the RAM 307 to the controller 101 in a shorter time.

Figure 5:
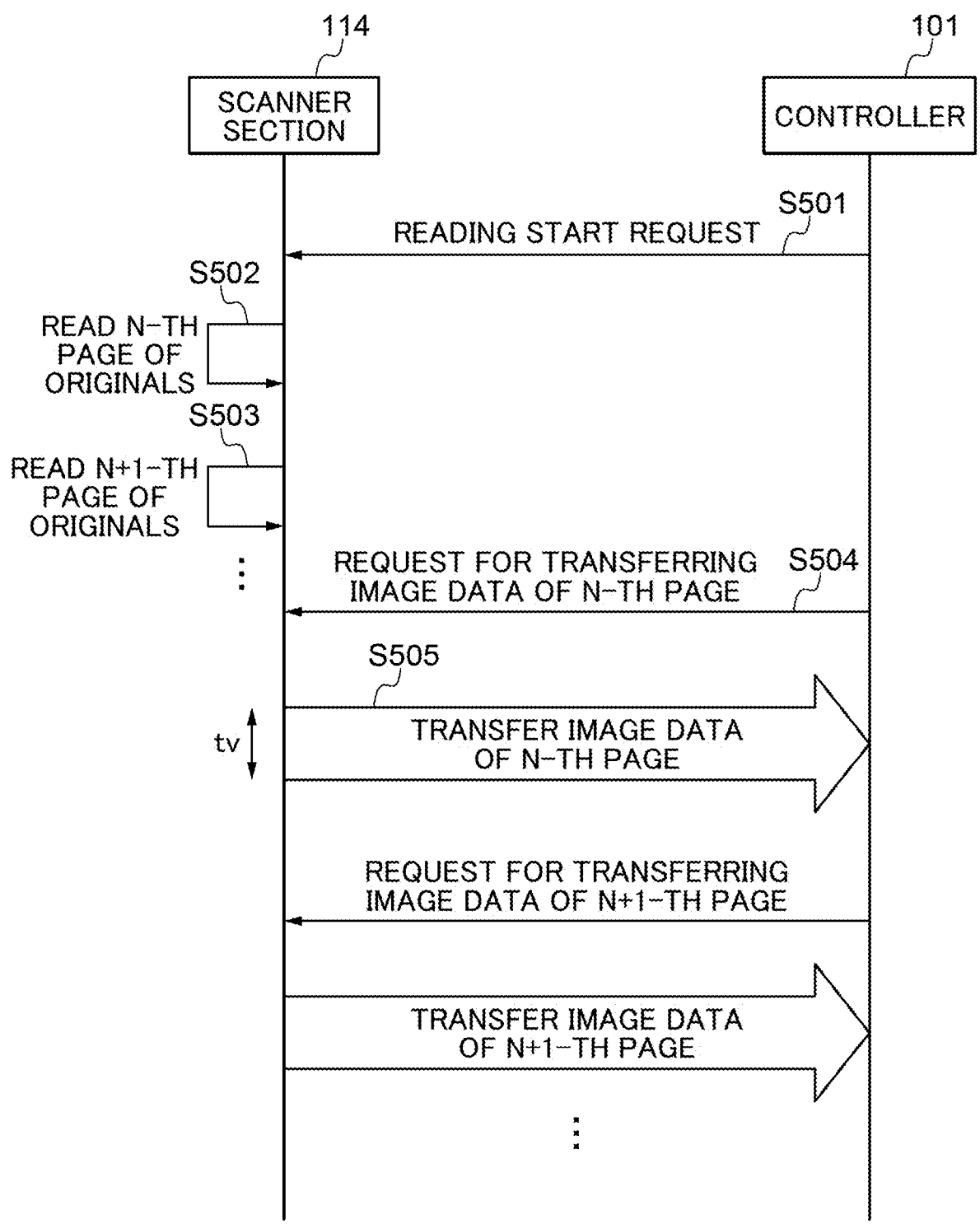
FIG. 5 is a sequence diagram of image reading operations performed by the MFP shown in FIG. 1.

FIG. 5 is a sequence diagram related to an image reading operation executed by the MFP 100 shown in FIG. 1. The reading operation in FIG. 5 is executed by the scanner section control application for controlling the scanner section 114 and a job control application (not shown) for controlling the controller 101.

Referring to FIG. 5, when a reading start request is received from the controller 101 (step S501), the scanner section 114 reads an N-th page of originals based on the readout clock 401 (step S502). Image data of the N-th page formed by a plurality of pixel data items read by the CCD elements is stored in the RAM 307. When reading of the N-th page of the originals is completed, the scanner section 114 reads the next page (N+1-th page) of the originals (step S503).

Figure 6:
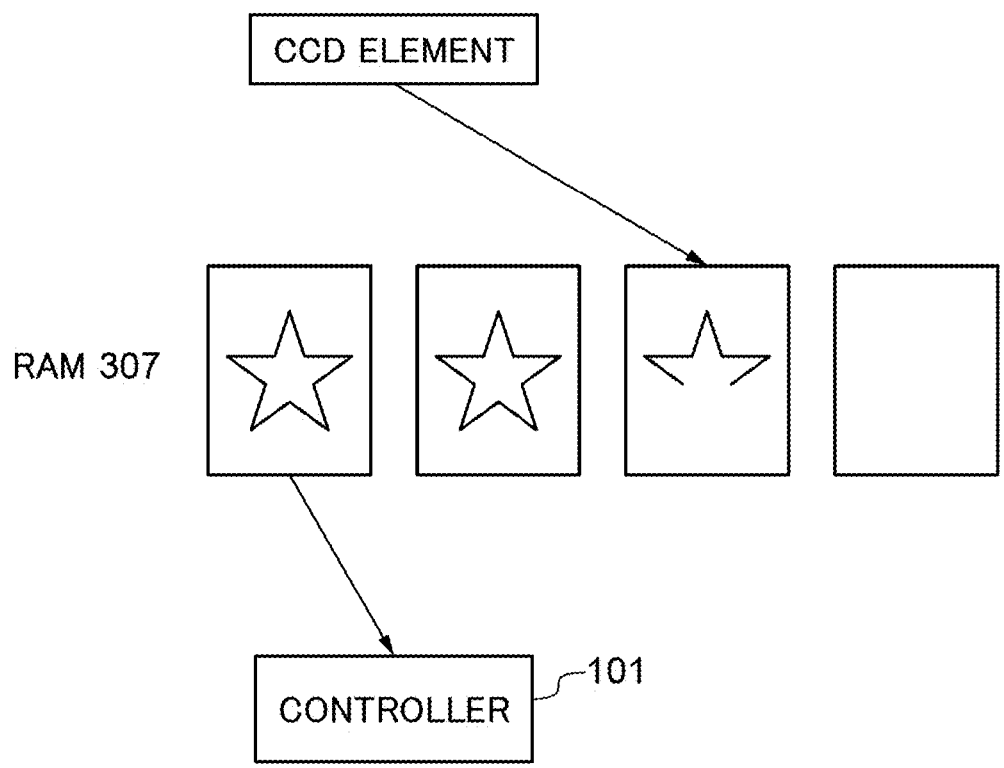
FIG. 6 is a diagram useful in explaining transfer of image data from a RAM to a controller, both appearing in FIG. 3.

On the other hand, when a request for transferring the image data of the N-th page is received from the controller 101 (step S504), the scanner section 114 transfers the image data of the N-th page to the controller 101 according to the transfer enable clock 402 (step S505). When the frequency of the transfer enable clock 402 is made higher, an image transfer time tv is made shorter, which means that the reading speed is increased. The image data which has been transferred to the controller 101 is deleted from the RAM 307. Note that in the MFP 100, image data of more than four pages cannot be stored in the RAM 307, as shown in FIG. 6, and hence data storage is controlled such that image data stored in the RAM 307 is transferred to the controller 101 before the storage area of the RAM 307 is used up.

FIG. 7 is a block diagram useful in explaining the configuration of the image processor 113 appearing in FIG. 1. Referring to FIG. 7, the image processor 113 includes the plurality of ASICs (scan ASIC, image processing ASICs, and print ASIC), denoted by reference numerals 701 to 705, which perform different types of image processing, such as resolution conversion, compression/expansion, and binary-data/multi-valued data conversion, on image data. The ASICs 701 to 705 share the RAM 104, and input and output data via the image bus 112. The image processor 113 can execute the plurality of image processing operations in parallel, using the ASICs 701 to 705. For example, scanned image processing by the scan ASIC 701 is executed in parallel with another image processing by the image processing ASIC 702, which is different from the scanned image processing. The scanned image processing includes e.g. processing for acquiring image data from the scanner section 114 via the image bus 112 and processing for performing image processing on the acquired image data.

The MFP 100 reads one side or both sides of an original placed on the DF section 200 according to an instruction provided by the user. Further, the MFP 100 is capable of simultaneously reading a front side and a reverse side of the original, i.e. capable of performing the simultaneous double-sided reading process.

Figure 8:
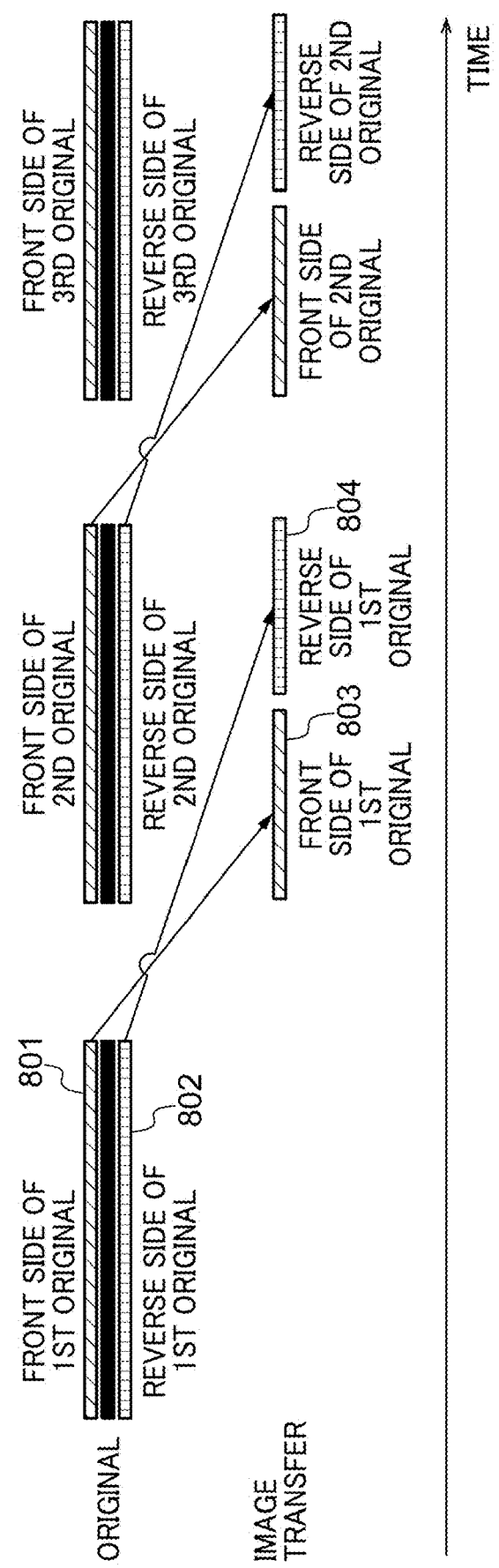
FIG. 8 is a diagram useful in explaining transfer of image data in a simultaneous double-sided reading process performed by the scanner section.

FIG. 8 is a diagram useful in explaining transfer of image data in the simultaneous double-sided reading process performed by the scanner section 114. The scanner section 114 reads both of a front side 801 and a reverse side 802 of one original during one original conveying operation. The scanner section 114 transfers image data 803 and 804 of the two sides, i.e. the read front side 801 and reverse side 802, to the controller 101, in succession in the mentioned order. The scanner section 114 transfers the image data of the two sides to the controller 101 within a time of conveying one original, whereby the MFP 100 executes the simultaneous double-sided reading process without reducing the original conveying speed.

Figure 9A:
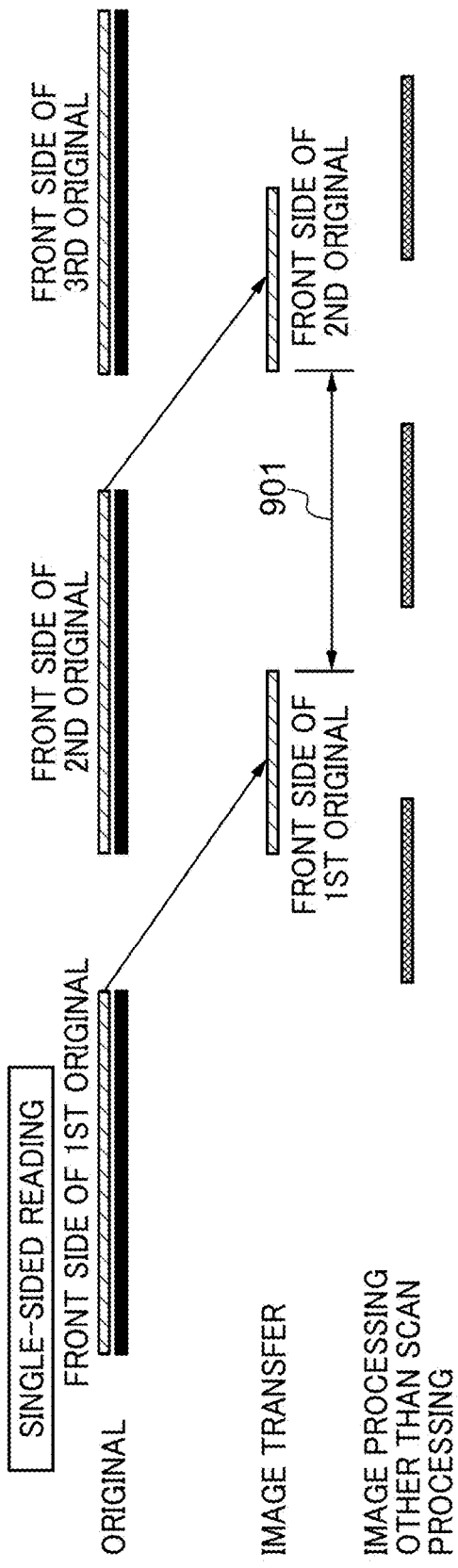
FIGS. 9A and 9B are diagrams useful in explaining congestion of an image bus, occurring in a case where a scanning process is executed in parallel with image processing.

Here, for example, in a single-sided reading process for reading only one side of an original, as shown in FIG. 9A, there is a time period 901 during which data transfer is not performed via the image bus 112 between transfer of image data of a first original and transfer of image data of a second original. Even when data transfer is performed via the image bus 112 due to another image processing during the time period 901, the image bus 112 is not congested. Further, in the single-sided reading process, the transfer enable clock 402 is set once for transfer of image data of one original.

Figure 9B:
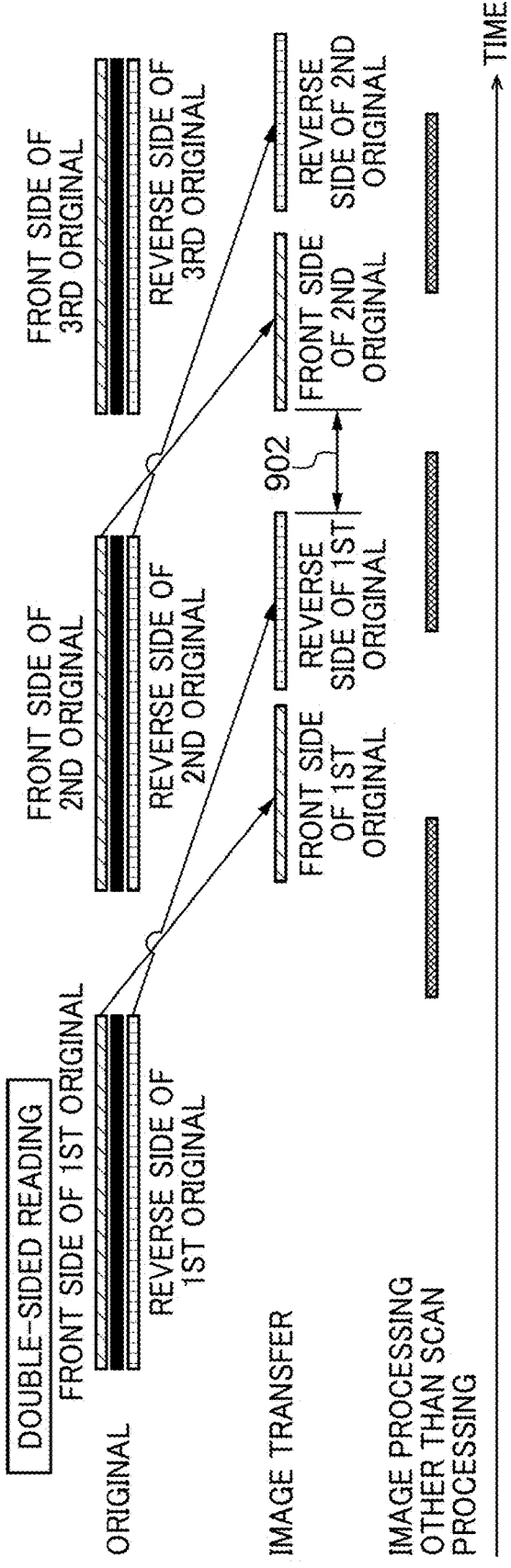

On the other hand, in the simultaneous double-sided reading process, the transfer enable clock 402 is required to be set for the two sides, i.e. the front side and the reverse side, i.e. required to be set twice. Further, in the simultaneous double-sided reading process, it is necessary to transfer the image data items of the two sides in succession during a time period over which one original is conveyed. For this reason, in the simultaneous double-sided reading process, if the scanner section 114 is operated at the same original reading speed and original conveying speed as those in the above-described single-sided reading process, a time period 902 appearing in FIG. 9B, in which data transfer is not performed via the image bus 112, becomes shorter than the time period 901. With this, as shown in FIG. 9B, there is a very high possibility that data transfer via the image bus 112 by the simultaneous double-sided reading process is performed in parallel with data transfer via the image bus 112 by another image processing. If data transfer via the image bus 112 by the simultaneous double-sided reading process is performed in parallel with data transfer via the image bus 112 by the other image processing, the image bus 112 is congested, and the data transfer amount exceeds the transferable upper limit value of the image bus 112. If the data transfer amount of the image bus 112 exceeds the transferable upper limit value, data transfer between the ASICs 701 to 705 and the RAM 104 is delayed or stopped, whereby execution of the simultaneous double-sided reading process is discontinued.

To prevent this, in the present embodiment, in a case where transfer of image data of a reverse side, which is performed in succession to transfer of image data of a front side, is executed in parallel with image processing, the frequency of the transfer enable clock 402 is switched from a predetermined frequency to a frequency lower than the predetermined frequency. In the following description, the frequency lower than the predetermined frequency is simply referred to as the "low frequency".

Figure 10:
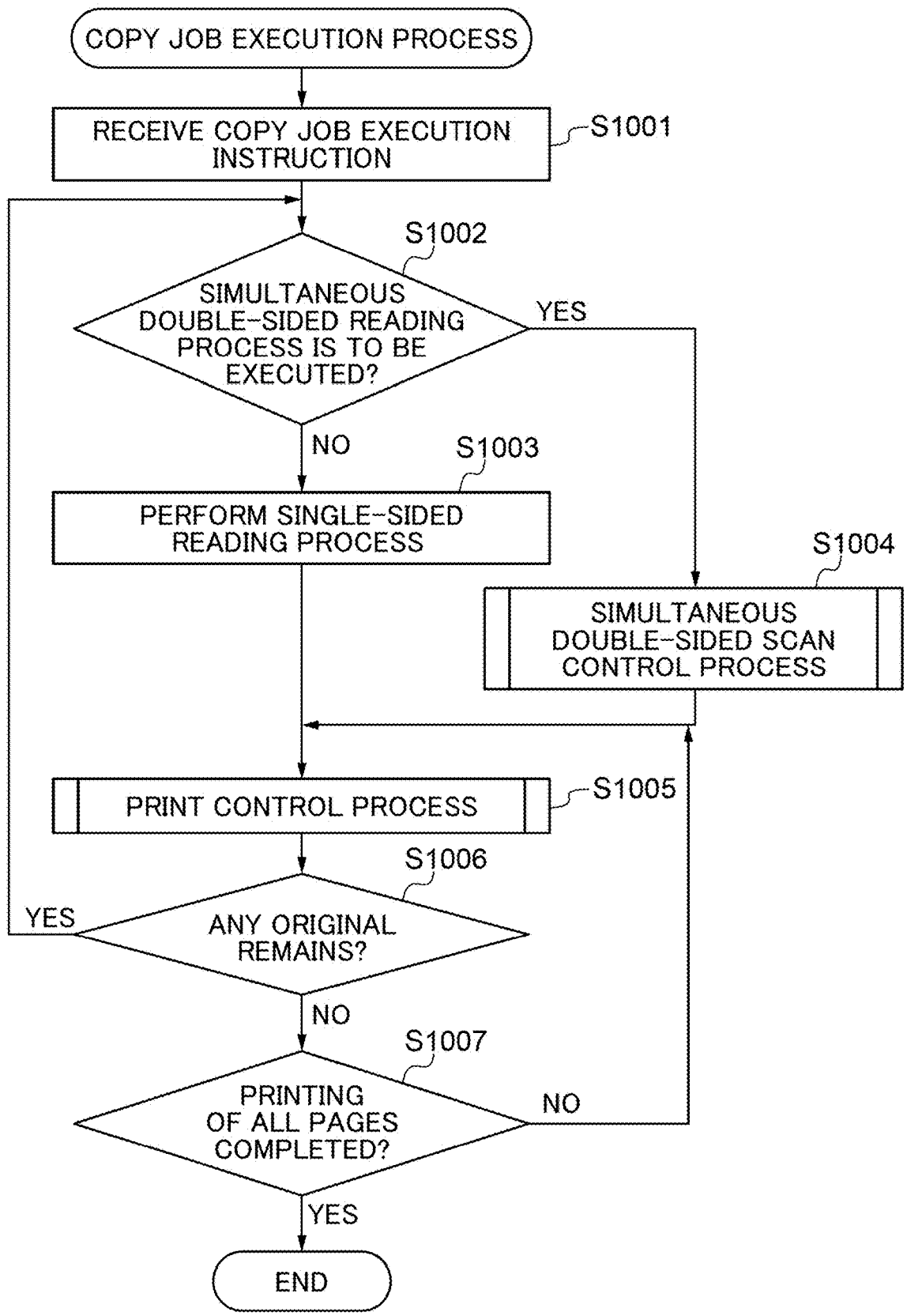
FIG. 10 is a flowchart of a copy job execution process performed by the MFP.

FIG. 10 is a flowchart of a copy job execution process performed by the MFP 100. The copy job includes a scanning process and a printing process. The copy job execution process in FIG. 10 is performed by the CPU 102 that executes an associated program stored e.g. in the ROM 103.

Referring to FIG. 10, first, when the CPU 102 receives an instruction for executing a job with copy settings (hereinafter referred to as the "copy job") input to the console section 109 by the user (step S1001), the CPU 102 executes a step S1002. In the step S1002, the CPU 102 determines, based on the copy settings, whether or not to execute the simultaneous double-sided reading process.

If it is determined in the step S1002 that the simultaneous double-sided reading process is not to be executed, the CPU 102 executes the single-sided reading process (step S1003), and performs image processing on image data obtained by reading one side of an original. Then, the CPU 102 executes a print control process, described hereinafter with reference to FIG. 12 (step S1005).

If it is determined in the step S1002 that the simultaneous double-sided reading process is to be executed, the CPU 102 performs a simultaneous double-sided scan control process, described hereinafter with reference to FIG. 11 (step S1004). Then, the CPU 102 executes the print control process in the step S1005. In a case where the copy job received in the step S1001 is a job for copying a plurality of pages of originals, the CPU 102 executes the steps S1002 to S1005 for each page. Then, the CPU 102 determines whether or not any original remains on the DF section 200 (step S1006).

If it is determined in the step S1006 that there is any remaining original in the DF section 200, the CPU 102 returns to the step S1002. If it is determined in the step S1006 that there is no remaining original in the DF section 200, the CPU 102 determines whether or not the printing process is completed for all pages of the originals. (step S1007).

If it is determined in the step S1007 that the printing process is not completed for any one of the pages, the CPU 102 returns to the step S1005. If it is determined in the step S1007 that the printing process is completed for all pages, the CPU 102 terminates the present process.

Figure 11:
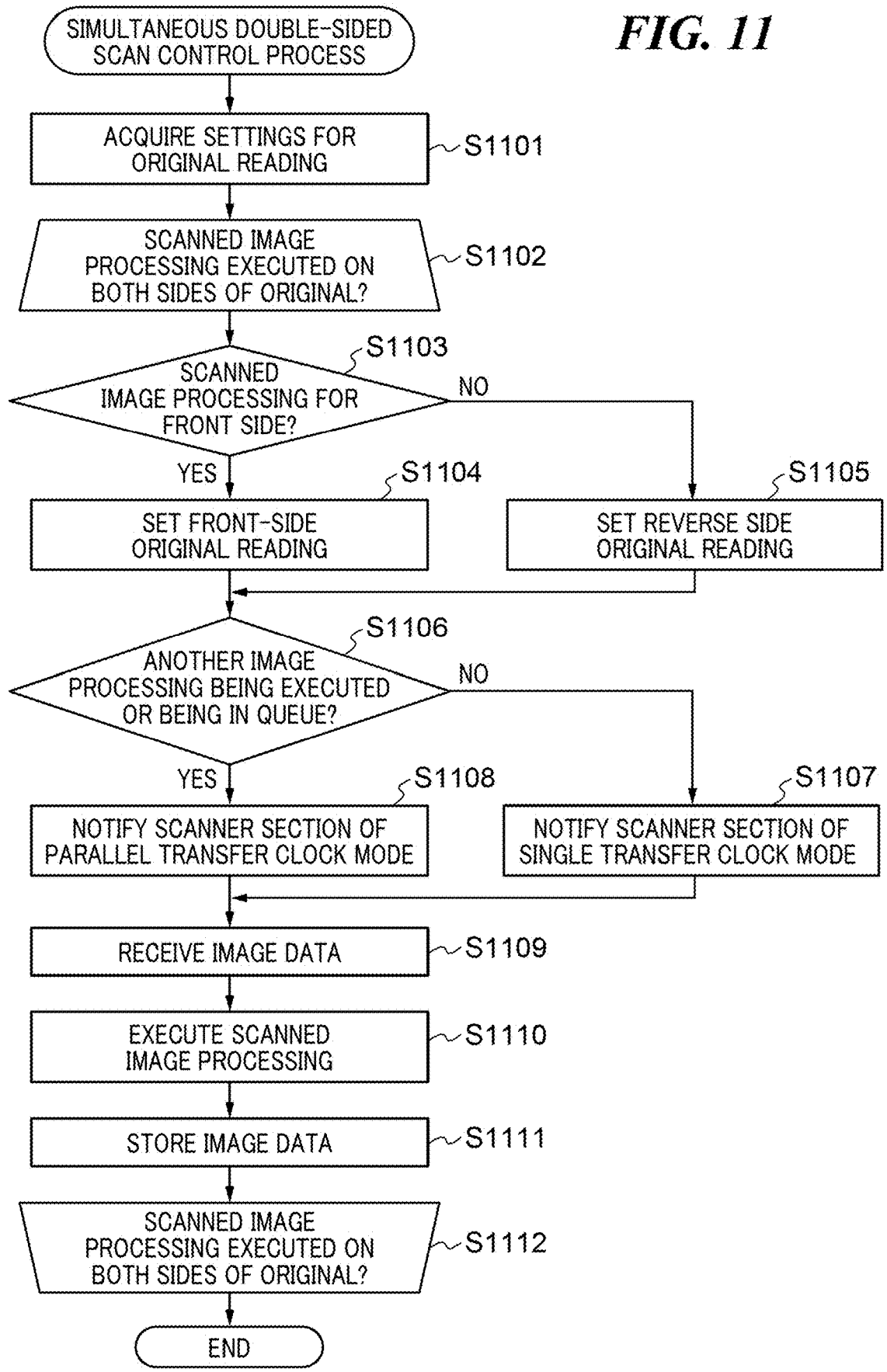
FIG. 11 is a flowchart of a simultaneous double-sided scan control process in a step in FIG. 10.

FIG. 11 is a flowchart of the simultaneous double-sided scan control process in the step S1004 in FIG. 10. The simultaneous double-sided scan control process in FIG. 11 is performed by the CPU 102 that executes an associated program stored e.g. in the ROM 103. For example, in a case where the copy job received in the step S1001 is a job for copying a plurality of pages of originals the simultaneous double-sided scan control process is performed for each one page.

Referring to FIG. 11, the CPU 102 acquires settings for original reading, which were input to the console section 109 (step S1101). Then, the CPU 102 determines whether or not scanned image processing has been executed for both sides of an original (step S1102).

If it is determined in the step S1102 that the scanned image processing has been executed for both sides of the original, the CPU 102 terminates the present process and executes the simultaneous double-sided scan control process for the next original. If it is determined in the step S1102 that the scanned image processing has not been executed for both sides of the original, the CPU 102 determines, based on the number of times of transferring image data from the scanner section 114, whether or not the image processing to be executed is scanned image processing for the front side (step S1103).

If it is determined in the step S1103 that the image processing to be executed is the scanned image processing for the front side, the CPU 102 determines, out of the ASICs 701 to 705 of the image processor 113, an ASIC for executing the scanned image processing set by the acquired settings for original reading. The CPU 102 sets front-side original reading for the determined ASIC (step S1104), and executes a step S1106, described hereinafter.

If it is determined in the step S1103 that the image processing to be executed is not the scanned image processing for the front side, the CPU 102 determines, out of the ASICs 701 to 705 of the image processor 113, an ASIC for executing the scanned image processing set by the acquired settings for original reading. The CPU 102 sets reverse-side original reading for the determined ASIC (step S1105). Then, the CPU 102 determines whether or not any other image processing by an ASIC other than the determined ASIC is being executed or being in queue (step S1106).

If it is determined in the step S1106 that no other image processing is being executed or being in queue, the CPU 102 notifies the scanner section 114 that the scanner section 114 is to operate in a single transfer clock mode (step S1107). In the single transfer clock mode, the clock controller 303 sets the frequency of the transfer enable clock 402 to a first frequency which is the predetermined frequency. The scanner section 114 transfers the image data to the controller 101 by the transfer enable clock 402 of the set first frequency. Then, the CPU 102 executes a step S1109, described hereinafter.

If it is determined in the step S1106 that any other image processing is being executed or being in queue, the CPU 102 notifies the scanner section 114 that the scanner section 114 is to operate in a parallel transfer clock mode (step S1108). In the parallel transfer clock mode, the clock controller 303 sets the frequency of the transfer enable clock 402 to the low frequency. The scanner section 114 transfers the image data to the controller 101 by the transfer enable clock 402 of the set frequency. When the transfer mode is switched from the single transfer clock mode to the parallel transfer clock mode, in the scanned image processing, the number of pulse signals for image data per unit time is reduced and the amount of data transferred via the image bus 112 per unit time is reduced. Thus, in the present embodiment, in the simultaneous double-sided reading process, when starting one of the scanned image processing for scanning the front side of an original or the scanned image processing for scanning the reverse side of the original, the frequency of the transfer enable clock 402 is switched based on whether or not any other image processing is to be executed in parallel. The scanned image processing includes processing for transferring image data obtained by reading an original from the scanner section 114 to the image processor 113 via the image bus 112.

For example, in a case where transfer of image data of the front side of an original is singly executed, the frequency of the transfer enable clock 402 is set to the first frequency. In a case where transfer of image data of the reverse side of an original, which is performed in succession to the transfer of image data of the front side of the original, is executed in parallel with any other image processing, the frequency of the transfer enable clock 402 is switched from the first frequency to a second frequency.

Further, in a case where transfer of image data of the front side of the original is executed in parallel with another image processing, the frequency of the transfer enable clock 402 is set to the low frequency. In a case where the other image processing is terminated, and transfer of image data of the reverse side of the original, which is performed in succession to the transfer of image data of the front side of the original, is singly executed, the frequency of the transfer enable clock 402 is switched from the low frequency to the predetermined frequency.

Then, the CPU 102 receives the image data from the scanner section 114 (step S1109). Then, the CPU 102 performs the scanned image processing for the received image data using the ASIC for which the settings for original reading are set (step S1110). Then, the CPU 102 stores the image data subjected to the scanned image processing in the RAM 104 (step S1111), and determines whether or not the scanned image processing has been executed for both sides of the original (step S1112).

If it is determined in the step S1112 that the scanned image processing has not been executed for any one of the sides of the original, the CPU 102 returns to the step S1103. If it is determined in the step S1112 that the scanned image processing has been executed for the both sides of the original, the CPU 102 terminates the present process, and executes the simultaneous double-sided scan control process for the next original.

Note that although in the present embodiment, the description is given of the case where the simultaneous double-sided scan control process is performed at the step S1004 of the copy job execution process in FIG. 10, the simultaneous double-sided scan control process may be performed when an instruction for executing a simultaneous double-sided scan job is received from a user. For example, in a case where an instruction for executing a simultaneous double-sided scan job including the scanning process for reading both sides of a plurality of originals is received, the MFP 100 performs the simultaneous double-sided scan control process for each page.

Figure 12:
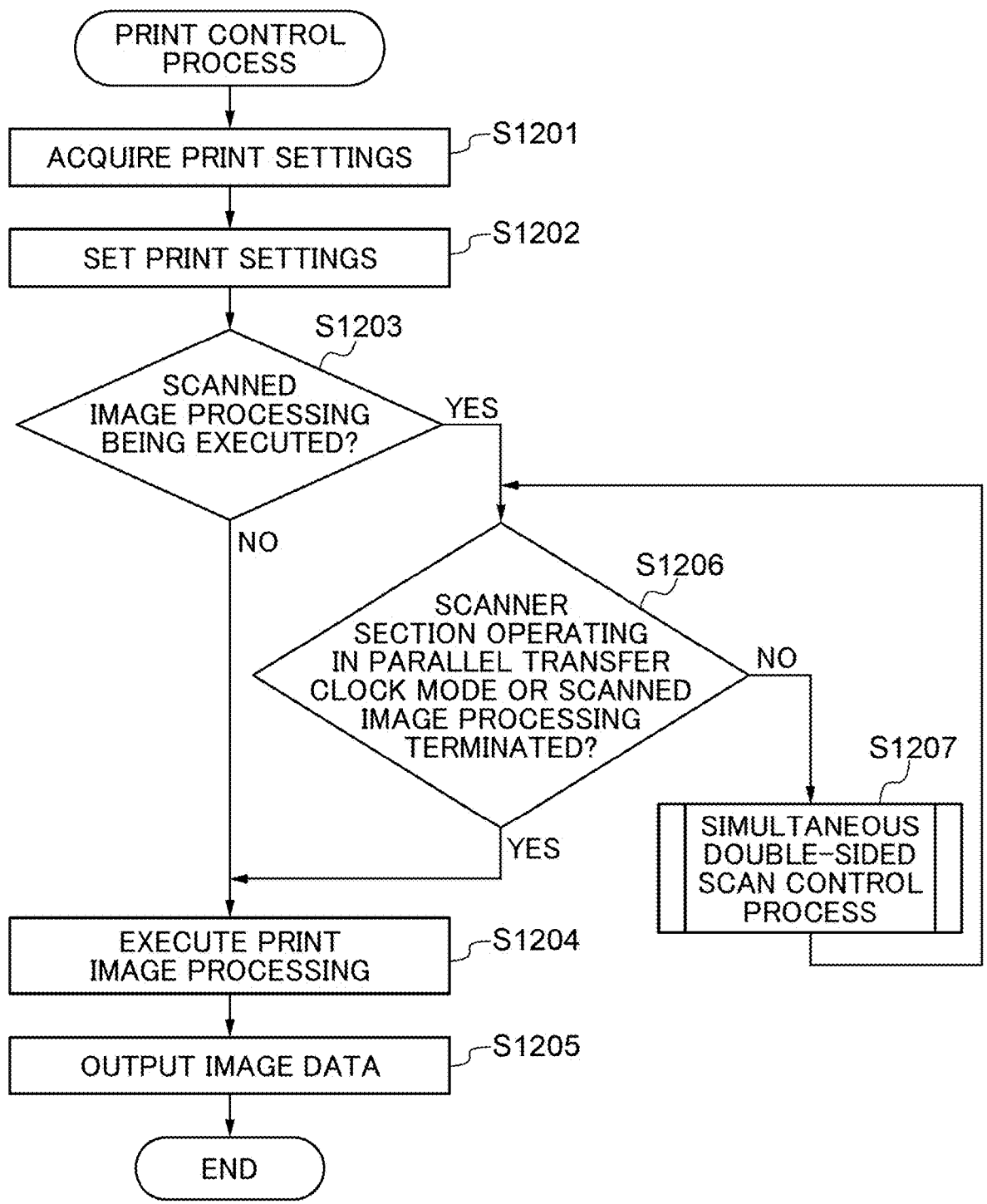
FIG. 12 is a flowchart of a print control process in a step in FIG. 10.

FIG. 12 is a flowchart of the print control process in the step S1005 in FIG. 10.

Referring to FIG. 12, the CPU 102 acquires print settings for the copy job set from the console section 109 (step S1201). Then, the CPU 102 determines out of the ASICs 701 to 705 of the image processor 113, an ASIC for executing the print image processing set by the acquired print settings (step S1202). The print image processing includes e.g. RIP (Raster Image Processing). Then, the CPU 102 determines whether or not scanned image processing is being executed (step S1203).

If it is determined in the step S1203 that scanned image processing is not being executed, the CPU 102 performs the print image processing on image data stored in the RAM 104 using the ASIC for which the print settings have been set (step S1204). Then, the CPU 102 outputs the image data subjected to the print image processing to the print section 115 (step S1205), followed by terminating the present process.

If it is determined in the step S1203 that scanned image processing is being executed, the CPU 102 determines whether or not the scanner section 114 is operating in the parallel transfer clock mode or has finished the scanned image processing (step S1206).

If it is determined in the step S1206 that the scanner section 114 is neither operating in the parallel transfer clock mode nor has finished the scanned image processing, the CPU 102 executes the above-described simultaneous double-sided scan control process (step S1207). When the process in the step S1207 is terminated, the CPU 102 returns to the step S1206.

If it is determined in the step S1206 that the scanner section 114 is operating in the parallel transfer clock mode or has finished the scanned image processing, the CPU 102 executes the step S1204 et seq.

According to the above-described embodiment, in a case where transfer of image data of the reverse side of an original, which is performed in succession to transfer of image data of the front side of the original, is performed in parallel with another image processing, the frequency of the transfer enable clock 402 is switched from the predetermined frequency to the low frequency. This makes it possible, when the simultaneous double-sided reading process is executed in parallel with the image processing involving data transfer via the image bus 112, to control the amount of data transferred via the image bus 112 per unit time such that it does not exceed the transferable upper limit value. As a result, it is possible to prevent discontinuation of the simultaneous double-sided reading process, caused by congestion of the image bus 112.

Further, in the above-described embodiment, in a case where image processing executed in parallel with transfer of image data of the front side of an original is terminated and transfer of image data of the reverse side of the original is singly executed, the frequency of the transfer enable clock 402 is switched from the low frequency to the predetermined frequency. This makes it is possible to suppress, to the minimum, increase in transfer time of image data due to the switching control of the frequency of the transfer enable clock 402 performed so as to prevent discontinuation of the simultaneous double-sided reading process from being caused by congestion of the image bus 112.

Further, in the above-described embodiment, the image processor 113 transfers data to or from the scanner section 114, the RAM 104, and the printer section 115, via the one image bus 112. With this, in the above-described configuration, it is possible to prevent discontinuation of the simultaneous double-sided reading process from being caused by congestion of the image bus 112.

Figure 13:
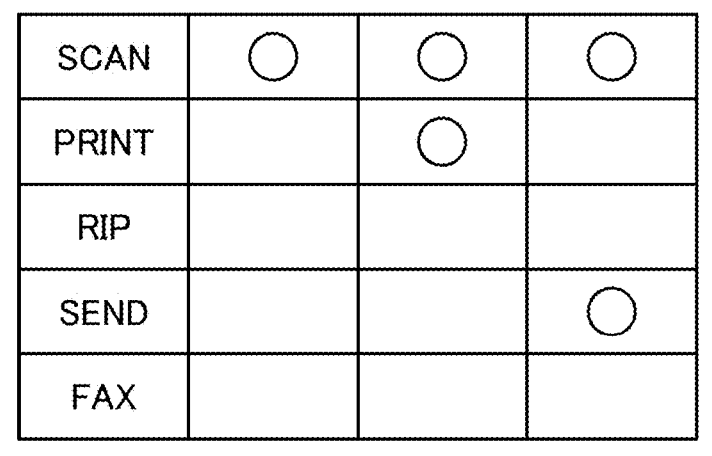

Although the present invention is described based on the above-described embodiment, the present invention is not limited to the above-described embodiment. For example, the scanner section 114 may be operated in the single transfer clock mode when another image processing is executed in parallel with scanned image processing. For example, in a case where scanned image processing is executed in parallel with print image processing, or a case where scanned image processing is executed in parallel with send processing, even when the scanner section 114 is operated in the single transfer clock mode, the data transfer amount of the image bus 112 does not exceed the transferable upper limit value (see e.g. an example of combinations of the image processing operations in FIG. 13). In these cases, the MFP 100 operates the scanner section 114 in the single transfer clock mode.

Figure 14A:
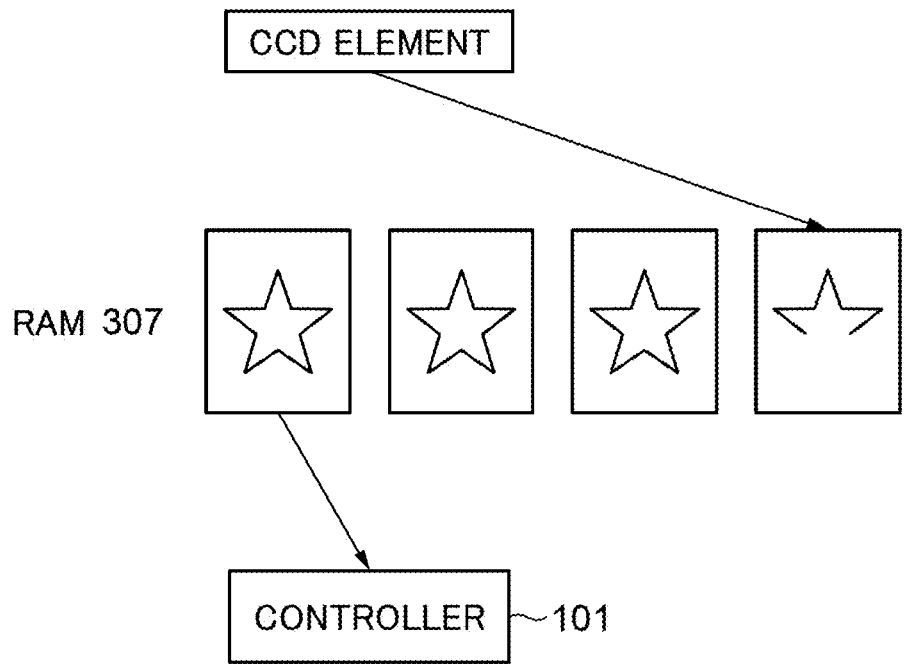
FIGS. 14A and 14B are diagrams useful in explaining control of original reading in a case where the RAM appearing in FIG. 3 is used up.
Figure 14B:
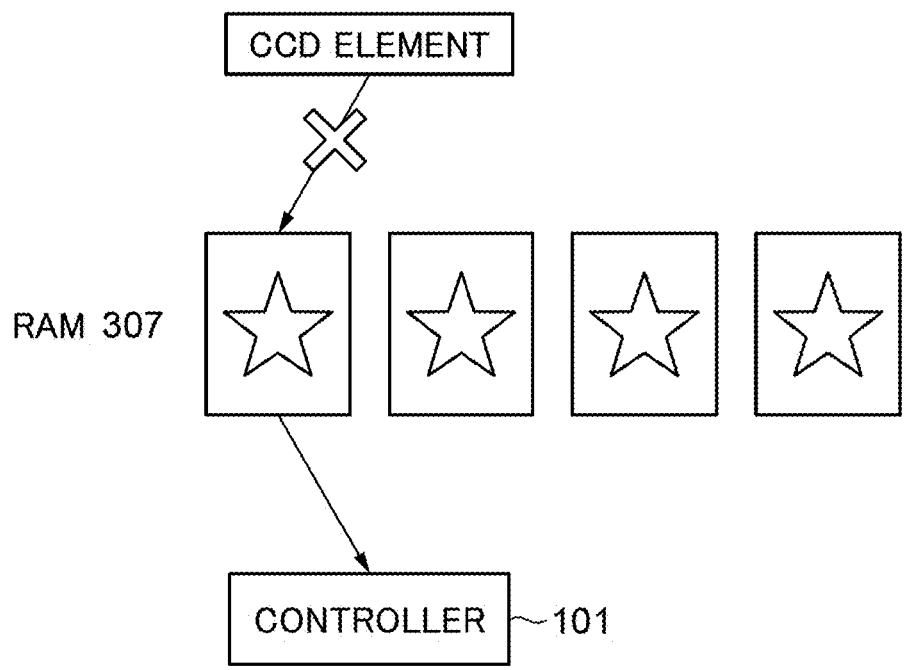

In the above-described embodiment, in the parallel transfer clock mode, the data transfer rate at which image data stored in the RAM 307 is transferred to the controller 101 is lower than the reading speed at which image data obtained by reading an original is stored in the RAM 307. Therefore, if reading of an original is continued in the parallel transfer clock mode, the storage area of the RAM 307 of the scanner section 114 is to be used up. If the RAM 307 is used up, as shown in FIGS. 14A and 14B, it is preferable to stop original reading until the scanner section 114 finishes transfer of image data of one original to the controller 101 whereby a free space is secured in the RAM 307. Alternatively, the use state of the RAM 307 is checked, and the frequency of the readout clock 401 may be temporarily reduced to a frequency lower than the transfer enable clock 402 in the parallel transfer clock mode, giving priority to the prevention of using-up of the storage capacity of the RAM 307.

In the above-described embodiment, when transferring image data of the reverse side of the last read original, the frequency of the transfer enable clock 402 need not be switched regardless of whether the transfer of the image data of the reverse side of the last read sheet is executed in parallel with another image processing.

Figure 15A:
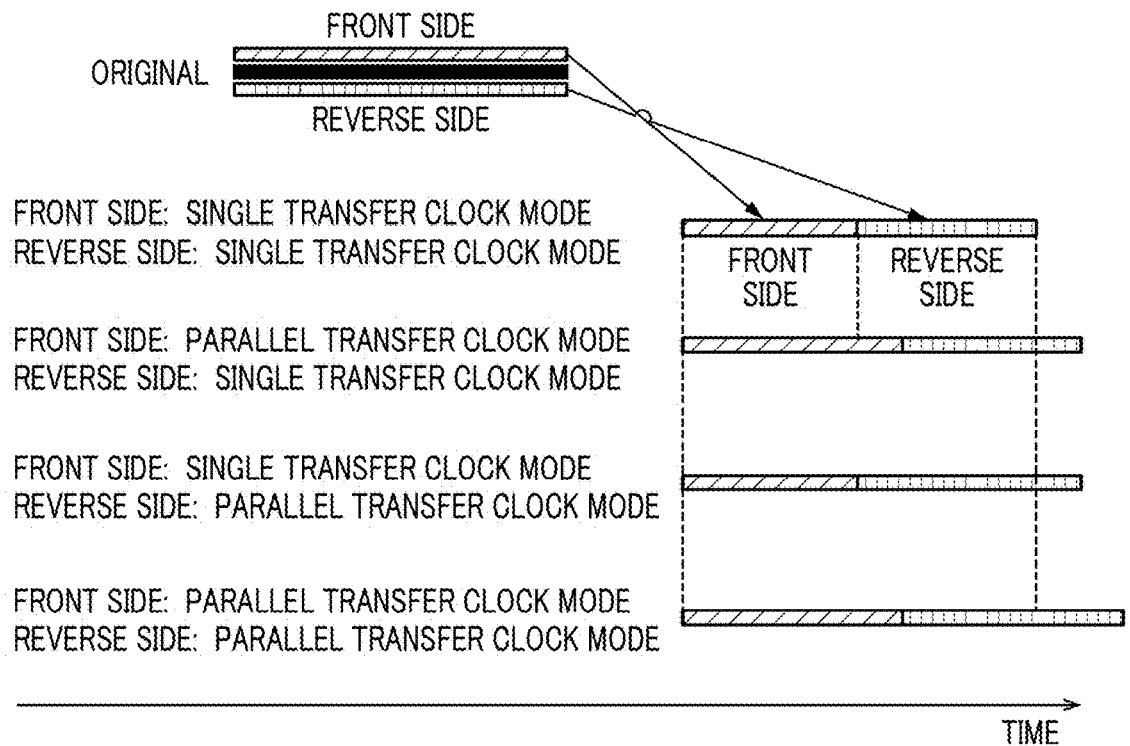
FIGS. 15A and 15B are diagrams useful in explaining a time lag in transfer of image data, caused by switching of a transfer enable clock appearing in FIG. 4B.
Figure 15B:
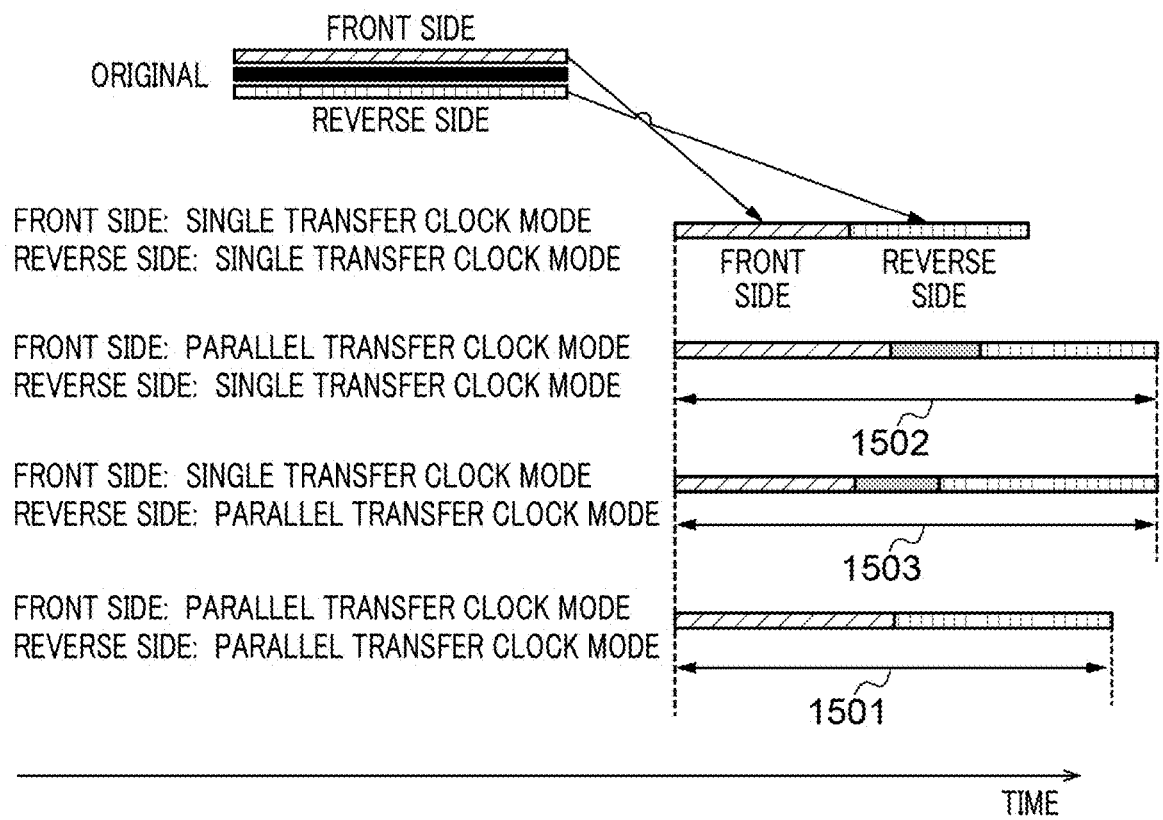

In the MFP 100, the transfer time required to transfer image data in the parallel transfer clock mode is longer than the transfer time required to transfer image data in the single transfer clock mode by a predetermined time period. For this reason, when transferring image data of one original in the simultaneous double-sided reading process in which the transfer clock mode can be switched for each side of the original, the transfer time required to transfer the image data items of both of the front side and the reverse side of the original in the parallel transfer clock mode becomes longest as shown in FIG. 15A. However, in actuality, a certain time period is required to switch the frequency of the transfer enable clock 402 because of the specifications of the scanner section 114. For this reason, if the transfer clock mode is changed when transferring image data of the reverse side, the scanner section 114 cannot immediately transfer the image data of the reverse side in succession to the transfer of the image data of the front side, which causes a time lag before the start of transfer of the image data of the reverse side. The length of the time lag is determined based e.g. on the specifications of the scanner section 114. Therefore, as shown in FIG. 15B, transfer times 1502 and 1053 required to transfer image data of an original by using the parallel transfer clock mode for one side of the original are sometimes longer than a transfer time 1501 required to transfer image data items of both of the front and reverse sides of the original in the parallel transfer clock mode. If the transfer time is increased by the time lag, throughput of the simultaneous double-sided reading process is lowered. It is desired that the above-mentioned lowering of throughput of the simultaneous double-sided reading process, which is caused by the switching control of the frequency of the transfer enable clock 402, is reduced to the minimum possible.

Figure 16:
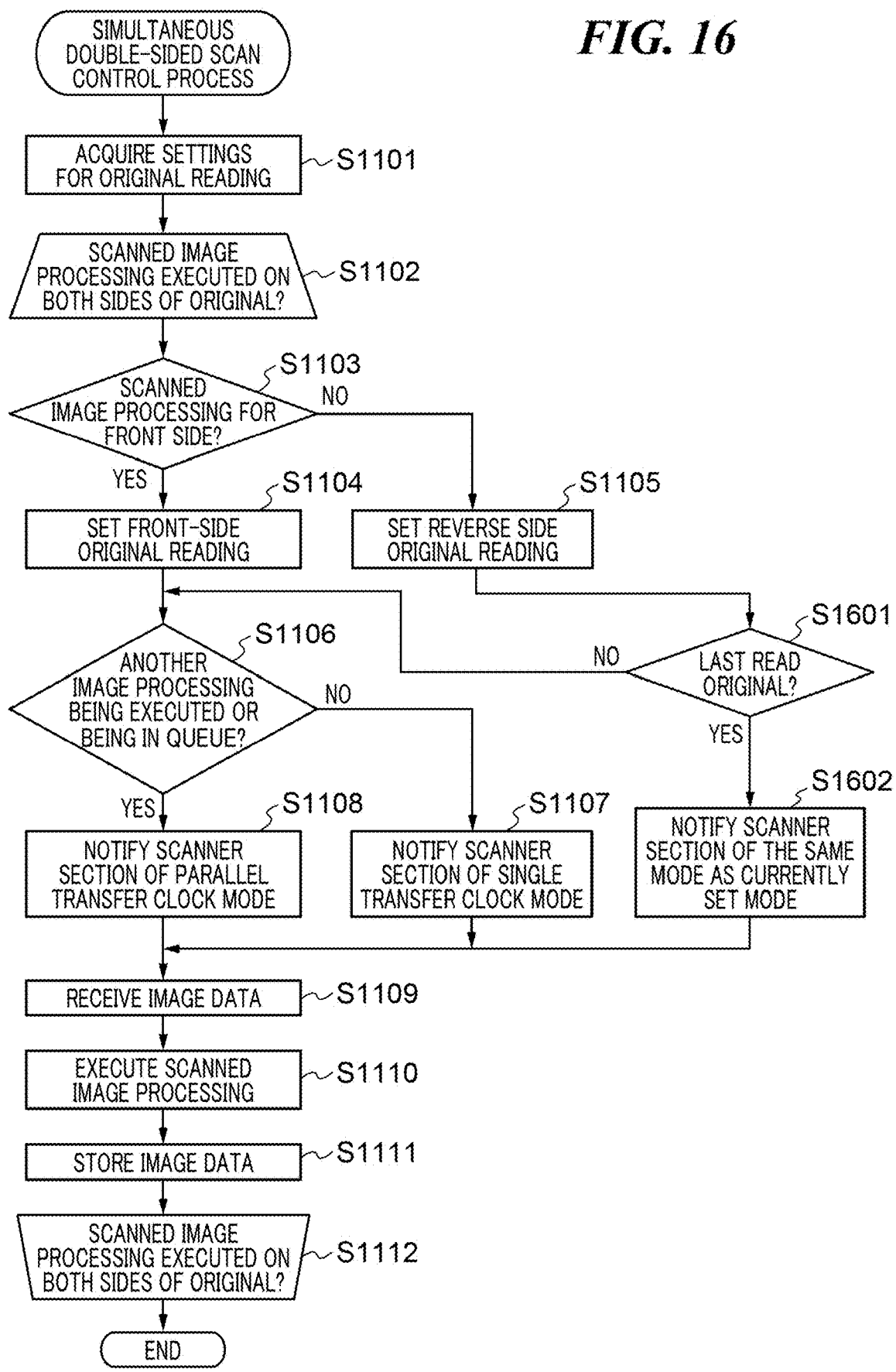
FIG. 16 is a flowchart of a variation of the simultaneous double-sided scan control process in FIG. 11.

FIG. 16 is a flowchart of a variation of the simultaneous double-sided scan control process in FIG. 11. The simultaneous double-sided scan control process in FIG. 16 is also performed by the CPU 102 that executes an associated program stored e.g. in the ROM 103. The process in FIG. 16 is also executed, in a case where a copy job received in the step S1001 is a job for copying a plurality of pages of originals, for each page.

Referring to FIG. 16, the CPU 102 executes the steps S1101 to S1103. If it is determined in the step S1103 that the image processing to be executed is the scanned image processing for the front side, the CPU 102 executes the step S1104 et seq. If it is determined in the step S1103 that the image processing to be executed is not the scanned image processing for the front side, the CPU 102 executes the step S1105. Then, the CPU 102 determines whether or not an object to be read is the last read original (step S1601).

If it is determined in the step S1601 that the object to be read is not the last read original, the CPU 102 executes the step S1106 et seq. If it is determined in the step S1601 that the object to be read is the last read original, the CPU 102 notifies the scanner section 114 that the scanner section 114 is to operate in the same mode as the currently set mode (step S1602). That is, in the present embodiment, in a case where the object to be read is the reverse side of the last read original, the frequency of the transfer enable clock 402 is not switched. For example, in a case where the image processing executed in parallel with the transfer of image data of the front side of the last read original is terminated and transfer of image data of the reverse side of the last read original is to be singly executed, the frequency of the transfer enable clock 402 is maintained at the low frequency. Further, in a case where transfer of image data of the front side of the last read original is singly executed and another image processing is scheduled to be executed in parallel with transfer of image data of the reverse side of the last read original, the frequency of the transfer enable clock 402 is maintained at the predetermined frequency. In this case, the CPU 102 queues execution of the other image processing scheduled to be executed in parallel with the transfer of image data of the reverse side of the last read original (operation of the image processing control unit). This prevents the transfer of image data of the reverse side of the last read original from being executed in parallel with the other image processing whereby congestion of the image bus 112 is avoided. Then, the CPU 102 executes the step S1109 et seq.

In the above-described embodiment, in a case where image data of the reverse side of the last read original is transferred, the frequency of the transfer enable clock 402 is not switched regardless of whether or not the transfer of image data of the reverse side of the last read original is executed in parallel with another image processing. This makes it possible, when transferring image data of the reverse side of the last read original, to suppress lowering of throughput of the simultaneous double-sided reading process, which is caused by switching of the transfer enable clock 402.

In the above-described embodiment, in a case where the image processing executed in parallel with transfer of image data of the front side of the last read original is terminated, and transfer of image data of the reverse side of the last read original is singly executed, the frequency of the transfer enable clock 402 is maintained at the low frequency. This makes it possible to prevent the transfer of image data of the reverse side of the last read original from being delayed due to switching of the frequency of the transfer enable clock 402.

In the above-described embodiment, in a case where transfer of image data of the front side of the last read original is singly executed and another image processing is scheduled to be executed in parallel with transfer of image data of the reverse side of the last read original, the frequency of the transfer enable clock 402 is maintained at the predetermined frequency and execution of the image processing scheduled to be executed in parallel with the transfer of image data of the reverse side of the last read original is queued. This makes it possible to prevent the transfer of image data of the reverse side of the last read original from being delayed due to switching of the frequency of the transfer enable clock 402 while avoiding congestion of the image bus 112. Other Embodiments Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-161157, filed Sep. 4, 2019, which is hereby incorporated by reference herein in its entirety.

What is claimed is:

1. An image processing apparatus including a scanner controller and a controller, the image processing apparatus comprising:
   a scanner configured to scan a first side and a second side of a document sheet and generate image data of the document sheet, wherein the scanner controller includes a memory that stores the generated image data and the scanner controller is configured to transfer the image data to the controller;

wherein the controller includes an image processor configured to perform a predetermined image process on the image data transferred from the scanner controller, wherein the image processing apparatus is configured to determine whether another predetermined image process that differs from the predetermined image process is being performed, wherein, for transferring image data of the first side of the document sheet, the image processing apparatus is configured to set, in a case where it is determined that another predetermined image process is not being performed, a frequency of an image transfer clock to a first frequency, and set, in a case where it is determined by the image processing apparatus that another predetermined image process is being performed, the frequency of the image transfer clock to a second frequency lower than the first frequency, and wherein, for transferring image data of the second side of the document sheet, the image processing apparatus is configured to set, in a case where it is determined by the image processing apparatus that another predetermined image process is not being performed, the frequency of the image transfer clock to the first frequency, and set, in a case where it is determined by the image processing apparatus that another predetermined image process is being performed, the frequency of the image transfer clock to the second frequency.

2. The image processing apparatus multifunction peripheral according to claim 1, wherein, for transferring the image data of the second side of the document sheet, the image processing apparatus is configured to set, in a case where it is determined by the image processing apparatus that another predetermined image process is being performed when the scanner scans the second side of the document sheet, the frequency of the image transfer clock to the second frequency.

3. The image processing apparatus according to claim 1, wherein, for transferring image data of the second side of the last document sheet, the image processing apparatus is configured to not change the frequency of the image transfer clock regardless of whether or not another predetermined image process is being performed.

4. The image processing apparatus according to claim 1, wherein, for transferring the image data of the first side of the last document sheet, the image processing apparatus is configured to set, in the case where it is determined by the image processing apparatus that another predetermined image process is being performed, the frequency of the image transfer clock to the second frequency, and wherein, for transferring the image data of the second side of the last document sheet, the image processing apparatus is configured to set, in the case where it is determined by the image processing apparatus that another predetermined image process is not being performed, the frequency of the image transfer clock to the first frequency.

5. The image processing apparatus according to claim 3, further comprising an image bus, wherein the image processor is configured to perform the predetermined image process on the image data transferred from the scanner controller via the image bus.

6. The image processing apparatus according to claim 1, further comprising a storage configured to temporarily store image data, wherein the image data on which the predetermined image process is performed is transferred to the storage.

7. The image processing apparatus according to claim 1, wherein the controller is configured to determine whether another predetermined image process that differs from the predetermined image process is being performed, wherein, for transferring image data of the first side of the document sheet, the controller is configured to set, in a case where it is determined by the controller that another predetermined image process is not being performed, a frequency of the image transfer clock to a first frequency, and set, in a case where it is determined by the controller that another predetermined image process is being performed, the frequency of the image transfer clock to a second frequency lower than the first frequency, and wherein, for transferring image data of the second side of the document sheet, the controller is configured to set, in a case where it is determined by the controller that another predetermined image process is not being performed, the frequency of the image transfer clock to the first frequency, and set, in a case where it is determined by the controller that another predetermined image process is being performed, the frequency of the image transfer clock to the second frequency.

8. A method of controlling an image processing apparatus that includes a scanner controller, a controller, and a scanner configured to scan a first side and a second side of a document sheet, the scanner controller including a memory that stores the generated image data and being configured to transfer the image data to the controller, the controller including an image processor configured to perform a predetermined image process on the image data transferred from the scanner controller, the method comprising:

determining whether another predetermined image process that differs from the predetermined image process is being performed;

setting, for transferring image data of the first side of the document sheet, in a case where it is determined that another predetermined image process is not being performed, a frequency of an image transfer clock to a first frequency, and setting, in a case where it is determined that another predetermined image process is being performed, the frequency of the image transfer clock to a second frequency lower than the first frequency; and setting, for transferring image data of the second side of the document sheet, in a case where it is determined that another predetermined image process is not being performed, the frequency of the image transfer clock to the first frequency, and setting, in a case where it is determined that another predetermined image process is being performed, the frequency of the image transfer clock to the second frequency.

9. A non-transitory computer-readable storage medium storing a computer-executable program for executing a method of controlling an image processing apparatus that includes a scanner controller, a controller, and a scanner configured to scan a first side and a second side of a document sheet, the scanner controller including a memory that stores the generated image data and being configured to transfer the image data to the controller, the controller including an image unit processor configured to perform a predetermined image process on the image data transferred from the scanner controller, wherein the method comprises:

determining whether another predetermined image process that differs from the predetermined image process is being performed;

setting, for transferring image data of the first side of the document sheet, in a case where it is determined that another predetermined image process is not being performed, a frequency of an image transfer clock to a first frequency, and setting, in a case where it is determined that another predetermined image process is being performed, the frequency of the image transfer clock to a second frequency lower than the first frequency; and setting, for transferring image data of the second side of the document sheet, in a case where it is determined that another predetermined image process is not being performed, the frequency of the image transfer clock to the first frequency, and setting, in a case where it is determined that another predetermined image process is being performed, the frequency of the image transfer clock to the second frequency.

* * * * *